US00RE41161E

(19) United States
(12) Reissued Patent
Shiota et al.

(10) Patent Number: US RE41,161 E
(45) Date of Reissued Patent: Mar. 2, 2010

(54) METHOD AND APPARATUS FOR REPRODUCING IMAGE FROM DATA OBTAINED BY DIGITAL CAMERA AND DIGITAL CAMERA USED THEREOF

(75) Inventors: Kazuo Shiota, Kaisei-machi (JP); Norihisa Haneda, Kaisei-machi (JP); Shigekazu Fukada, Kaisei-machi (JP); Kazuhiko Takemura, Kaisei-machi (JP)

(73) Assignee: FUJIFILM Corporation, Tokyo (JP)

(21) Appl. No.: 10/035,191

(22) Filed: Jan. 4, 2002

Related U.S. Patent Documents

Reissue of:
(64) Patent No.: 6,011,547
Issued: Jan. 4, 2000
Appl. No.: 08/956,033
Filed: Oct. 22, 1997

(30) Foreign Application Priority Data

Oct. 22, 1996 (JP) ..... 8-279205
Apr. 1, 1997 (JP) ..... 9-082897

(51) Int. Cl.
*G06T 5/00* (2006.01)
G06K 3/00

(52) U.S. Cl. ..... 715/716; 382/261

(58) Field of Classification Search ..... 715/719–726, 715/745–747, 811, 771–773, 965–966, 716, 715/717; 382/261–263, 254; 386/68, 109
See application file for complete search history.

(56) References Cited

U.S. PATENT DOCUMENTS 4,209,853 A * 6/1980 Hyatt ..... 367/8
4,574,319 A 3/1986 Konishi
5,499,294 A * 3/1996 Friedman ..... 713/179
5,552,824 A * 9/1996 DeAngelis et al. ..... 348/157
5,696,850 A * 12/1997 Parulski et al. ..... 382/261
5,768,633 A * 6/1998 Allen et al. ..... 396/2
5,838,872 A * 11/1998 Kawara ..... 386/68
5,874,999 A * 2/1999 Suzuki et al. ..... 348/556
5,937,218 A * 8/1999 Amano et al. ..... 396/311
6,147,708 A * 11/2000 Suzuki et al. ..... 348/231.99
6,231,155 B1 * 5/2001 Udagawa et al. ..... 347/19
6,295,415 B1 * 9/2001 Kashiyama et al. ..... 396/222
6,463,217 B1 * 10/2002 Saito et al. ..... 396/311
6,466,263 B1 * 10/2002 Suzuki ..... 348/220.1
6,636,635 B2 * 10/2003 Matsugu ..... 382/218
6,724,498 B1 * 4/2004 Shimazaki ..... 358/1.8
6,834,157 B2 * 12/2004 Yamagishi ..... 386/107

FOREIGN PATENT DOCUMENTS

JP 03-038986 2/1991

* cited by examiner

*Primary Examiner*—Steven P Sax
(74) *Attorney, Agent, or Firm*—Birch, Stewart, Kolasch & Birch, LLP

(57) ABSTRACT

When a picture image recorded by a digital camera is reproduced, a high quality picture image is immediately reproduced without repetitive test prints for enhancing a picture quality or repetitive minor adjustments based on a confirmation via a monitor. Recording is carried out by a digital camera having a function of adding recording information representing a recording condition (a recording information adding unit) to digital image data obtained by the recording. A set-up processing unit in an image reproducing apparatus carries out image processing on the image data obtained by the recording for enhancing a picture quality using the recording information added to the image data, and the image reproducing apparatus reproduces the image data in the form of a print or a display on a monitor.

70 Claims, 1 Drawing Sheet

METHOD AND APPARATUS FOR REPRODUCING IMAGE FROM DATA OBTAINED BY DIGITAL CAMERA AND DIGITAL CAMERA USED THEREOF

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a method and apparatus for reproducing images, using a printer or a monitor, from digital image data obtained by a digital camera, and also to a digital camera used for implementing the method.

2. Description of the Related Arts

The quality of a picture, especially the finish of a color picture, generally varies greatly depending on exposure conditions. Therefore, a camera has an AE mechanism for setting an appropriate exposure in response to how bright it is when a picture is recorded and luminance distribution on a target object. However, even an AE mechanism has a limit, and performance of the mechanism varies from camera to camera. Therefore, it is not necessarily guaranteed that a picture having a sufficient quality can always be recorded.

For this reason, at a photo shop or the like, processing for correcting overexposure or underexposure, and a bias in color is carried out by adjusting an exposure condition when a picture image is printed so that a picture print having as high a quality as possible is provided to a customer. In this case, image processing to be carried out obviously varies depending on a picture to be processed. Therefore, an optimal processing condition has been found by repetitive adjustments of an image processing condition based on a slight difference judged by experience in images shown on a monitor, or by confirming finish after a plurality of test prints have been created. Based on the image processing condition having been found, image processing is carried out to create a print which will finally be provided to a customer.

When an electronic camera using an electronic image pickup device (hereinafter called a digital camera) is used, the camera can often not carry out highly sophisticated processing due to restrictions on cost and processing time. In the case of a digital camera, an image obtained thereby may often be used as it is without a photo shop's involvement. Therefore, an AE mechanism having high performance may often not be incorporated with a digital camera, since picture quality is meant to be sufficient as long as an image displayed on a monitor having a comparatively generous tolerance in picture quality, such as an image displayed on a CRT monitor or on a liquid crystal display monitor attached to the digital camera, is not too blurry. As a result, when digital image data recorded by a digital camera are reproduced as a print, it is not easy to obtain optimal finish of a printed image having a strict picture quality tolerance, and a time consuming operation such as repeated test prints as described above is necessary.

However, correction by trial and error as described above is not only time consuming but also costly due to the test prints. It is also problematic that finish varies depending on experience or the skill of an operator who carries out the adjustment.

SUMMARY OF THE INVENTION

Based on consideration of the above problems, an object of the present invention is to provide an image reproducing method and apparatus which finds an optimal image processing condition quickly and simply without repetitive adjustments of the condition by test prints or confirmation of an image using a monitor, so that a high quality print can be promptly provided to a customer, when digital image data obtained by a digital camera are reproduced. Another object of the present invention is to provide a digital camera used for implementing the method.

An image reproducing method of the present invention comprises the steps of obtaining digital image data to which recording information representing a recording condition is added by a digital camera having a function of adding the recording information to the digital image data recorded thereby, storing in a predetermined storage medium the digital image data to which the recording information has been added, carrying out image processing for enhancing picture quality of the digital image data stored in the storing medium by using the recording information added to the digital image data, and reproducing the digital image data on which the image processing has been carried out.

The "recording information representing a recording condition" herein means, for example, to include both information specific to a camera such as the γ property of the camera (a ratio of input light amount versus output voltage) and the focal length of the lens, and information which varies at each recording depending on a photo taking environment or on an operation by a photographer, such as a focusing length, an EV value, a kind of lighting (color temperature), and whether or not a flash is used. The former information (the information specific to a camera) is unconditionally added as a portion of the recording information, and a photographer can not change this information. On the other hand, a photographer can intentionally determine the latter information by carrying out some operation.

"Adding recording information representing a recording condition to digital image data recorded" means that a file format comprising image data and recording information is determined, and the image data as well as recording information thereof are stored as a file having such a format in a built-in memory of a camera or a card memory, for example.

The "predetermined storage medium" herein means a built-in memory or the like attached to a camera, or a hard disc connected to an image server in a photo laboratory system or to a personal computer. In this case, image file copy from a memory attached to a camera to such a large capacity storage medium can be carried out using a card reader and a cable connection or the like.

The "image processing for enhancing a picture quality of the digital image data" means to carry out processing according to a predetermined algorithm based on a given condition. For example, the processing device to select a look-up table for correcting tone or a color. In this case, "carrying out image processing for enhancing a picture quality of the digital image data by using the recording information added to the digital image data" means to use the recording information in the processing for selecting an optimal look-up table.

Furthermore, according to the image reproducing method of the present invention, a variety of processing conditions of the image processing may be added to the digital image data after the image processing has been carried out thereon, and stored in the storage medium. The image processing for enhancing the picture quality of the digital image data may then be carried out using the processing conditions added to the digital image data which has been stored in the storage medium so that the digital image data which has been image processed can be reproduced.

"A variety of processing conditions of the image processing may be added to the digital image data" herein means, in the case of tone or color correction described above for example, to add the look-up table (LUT) found through the processing to the digital image data. In this manner, when the "image processing for enhancing a picture quality of digital image data" is carried out, the processing load can be reduced, since the digital image data may only be converted using the look-up table without carrying out the processing for finding out the processing conditions.

The image reproducing apparatus of the present invention is used for implementing the above image reproducing method, comprising an image processing device for carrying out the image processing for enhancing a picture quality of the digital image data using the recording information added to the digital image data, and a reproducing device for reproducing the digital image data which have been processed by the image processing device. "The image processing device" may carry out the image processing for enhancing a picture quality of the digital image data by using, instead of the recording information, the conditions of the image processing added to the digital image data.

A digital camera used for obtaining digital image data to be reproduced by the image reproducing method of the present invention comprises recording information adding device for adding the recording information to digital image data obtained by recording by the digital camera.

The image reproducing method and apparatus of the present invention has been created so that the method and apparatus adds, upon picture image recording, the recording information representing a recording condition to the digital image data obtained by a digital camera, and carries out the image processing for enhancing a picture quality using the recording information upon reproduction of the digital image data. Therefore, image processing for reproduction based on a recording condition can be carried out, and print having optimal finish can easily be obtained without repetitive test prints.

Moreover, not only the digital camera but also the image reproducing apparatus can add an optimal image processing condition obtained through a processing or the like to the image data. Therefore, the image data whose image processing condition has been found once, image processing thereafter is carried out by simply referring to the image processing condition, and the time needed for finding the image processing condition will no longer be necessary.

DESCRIPTION OF THE PREFERRED EMBODIMENT

Figure 1:
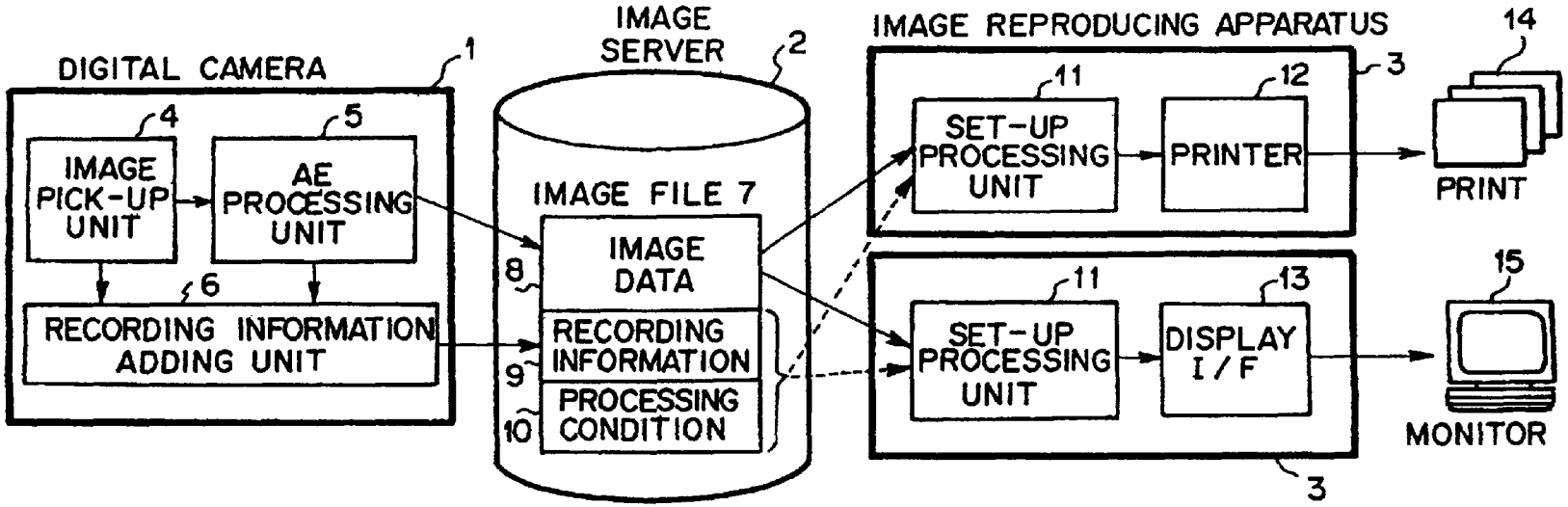
FIG. 1 shows an embodiment of the present invention.

Hereinafter, a preferred embodiment of the present invention will be explained referring to the accompanying drawing. FIG. 1 shows an embodiment of the present invention, and depicts a schematic laboratory system for reproducing image data obtained by a digital camera in the form of a print or the like.

A digital camera 1 comprises, as does a conventional digital camera, an image pickup unit 4 such as an optical system for carrying out recording, and an AE processing unit 5 for carrying out automatic exposure processing. A function such as automatic focusing is meant to be included in the image pickup unit 4. However, the presence or absence of such a function or a level thereof varies depending on the type of digital camera.

The digital camera 1 of the present invention further comprises a recording information adding unit 6. The recording information adding unit 6 is used to add a variety of recording information to digital image data obtained by recording. The information to be added is as listed below, for example.

First, the γ property representing a ratio of output voltage to an input light amount is listed as information specific to a camera. The γ property affects contrast of a picture, and often varies between cameras with a high price and a low price. As information specific to a camera other than the γ property, a focal length and F value of a lens can be listed.

It is also preferable to add the content of AE processing carried out by a camera as the recording information. As AE processing which is generally carried out, average processing, peak value processing, multipattern processing and the like are known. In this case, information regarding which of these processings have been carried out, or a parameter used in the processings should be added as the recording information. Likewise, it is also preferable to add an EV value showing how bright a target object is as the recording information.

However, if an exposure has been carried out by a manual operation rather than an automatic operation, it is preferable to add a variety of values set manually as the recording information. In this manner, the intentions of a photographer can be reflected in recording information, such as whether the atmosphere of a picture is merry or gloomy, and whether the picture has a sharp impression or a soft impression. As a result, image processing which reflects a photographer's intention can be carried out.

Some digital cameras enable designation of a photographer's intention by using a more vague expression rather than by setting a value such as an exposure value. For example, in some digital cameras, a mode setting can be possible such as a sun set mode when the sun is in the background of a picture being recorded, and a portrait mode when a figure is being recorded, and automatic exposure setting can be carried out based on the set mode. In the case where such a digital camera is used, it is better to provide such mode setting information to the digital camera as the recording information. In this manner, for a picture that a photographer wishes to finish as a sun set picture, sun set finish is carried out in the image processing and a print of a sun set can be provided in accordance with the photographer's imagination can be provided. Likewise, a picture can be reproduced in accordance with the intention of a photographer by carrying out optimal image processing based on each recording information such as snow finish for a picture expressing a sense of snow, scenery finish for a picture emphasizing scenery, portrait finish for a picture emphasizing good complexion (skin color), and monochrome finish for a picture to be produced in black and white.

Contrarily, since some users wish no correction processing at a photo shop, a designation for no correction to show that no correction is necessary can sometimes be provided as a camera function. In this case, the designation for no correction should only be included in the recording information.

Furthermore, some cameras with a highly sophisticated function may include a trimming designation function. In this case, only rough information specified by the camera function (for example, a designation such that only one person in the picture should be trimmed, or two persons should be trimmed) may be included in the recording information, and a detail designation of the area to be trimmed may be left to a photo shop's discretion.

Moreover, since a focusing length, a focusing position, and the like become important information when the image processing is carried out, it is better if they are included in the recording information. For example, when image processing is carried out upon printing, processing for extracting a main target object may be carried out for especially improving a picture quality of the main target object. If information relevant to focus is added as the recording information, it is judged that the main target object exists in an area of focus, and a complex extracting processing does not need to be carried out.

For reflecting on an image processing a kind and strength of light in the environment in which a picture image is recorded, it is preferable that a lighting condition obtained by a color temperature sensor or an exposure meter, whether or not a flash is used, and the outdoor weather at the time of recording if the recording is carried out outdoors, are included in the recording information.

It is also possible to add an image data the date and time of recording, or a theme title of the picture as a portion of the recording information.

The recording information adding unit 6 obtains the above recording information relevant to values specific to the camera from a setting of a camera upon shipment. On the other hand, the recording information adding unit 6 obtains recording information varying at each recording from the image pickup unit 4 or the AE processing unit 5 upon necessity by receiving data therefrom. The recording information adding unit 6 organizes the recording information into a predetermined format and adds the recording information to image data. More specifically, when image data are obtained and stored in a built-in memory or in a card memory, image data 8 together with the recording information 9 are stored in a set in an image file 7.

The digital image data having been stored in a memory in a digital camera are stored in an image server 2 via a card reader and a cable. Any ordinarily-used data copying method including the method using a network can be used as a method to copy the image file onto the image server 2.

On the other hand, the image reproducing apparatus 3 of the present invention is used to carry out sequential reproduction processings on image files 7 stored in the image server 2. The image reproducing apparatus 3 comprises a set-up processing unit 11 for carrying out image processing to enhance a picture quality of image data in each image file 7, a printer 12 or a display interface 13 for respectively outputting the image data having been set up by the set-up processing unit 11 in the form of a print 14 or in the form of a display on a monitor 15. The above recording information 9 is used directly for the processing in the set-up unit 11 or for judgment as to whether or not a predetermined processing should be carried out.

The set-up processing unit 11 carries out the processing according to a predetermined algorithm based on the recording information 9, and carries out the image processing by finding an optimal image processing condition. An image processing condition 10 may be added to image data 8 on this occasion. In this manner, it becomes unnecessary to carry out the same processing again when a print is created as an extra print for example, which leads to less time and cost. Furthermore, a print needs a higher picture quality than a display on a monitor. Therefore, once an image processing condition has been found and saved for the print, a high picture quality image can thereafter be displayed in a short time by using the saved information, when the image data are displayed on a monitor.

In the above explanation, a laboratory system has been used as an example, since a high quality picture image is especially needed by a print. However, the present invention can also be applicable to a case where a user enjoys an image using a personal computer. In other words, it becomes possible to display a high quality picture image on a monitor by carrying out the image processing using the recording information 9 with a personal computer in the same manner as does the above laboratory system.

What is claimed is:

1. An image reproducing method comprising:

obtaining digital image data recorded by a digital image recording device;

obtaining recording information representing a recording condition specific to the digital image recording device;

storing the digital image data and the recording information together as an image file together in an image server;

carrying out image processing of the image file for enhancing a picture quality of the digital image data having been stored in the storage medium by using the stored recording information to determine an optimal image processing condition; and reproducing the digital image data on which the image processing has been carried out based on the optimal image processing condition.

2. The image reproducing method as defined in claim 1, before the carrying out image processing step, further comprising:

adding the optimal image processing condition to the digital image data and the recording information for storage as the image file, wherein the carrying out step carries out the image processing of the image file stored in the storage medium for enhancing the picture quality of the digital image data based on the stored optimal image processing condition added to the image file.

3. An image reproducing apparatus comprising:

image serving means for storing digital image data, *having been recorded by a digital recording device,* and recording information together as an image file in an image server, *wherein recording information represents a recording condition specific to the digital image recording device*;

image processing means for carrying out an image processing of the image file for enhancing a picture quality of the digital image data using the stored recording information to determine an optimal image processing condition; and reproducing means for reproducing the digital image data processed by the image processing means based on the optimal image processing condition.

4. The image reproducing apparatus as defined in claim 2 or 5, comprising recording information adding means for adding the recording information to the digital image data.

5. The image reproducing apparatus as defined in claim 3, further comprising:

means for adding the optimal image processing condition to the digital image data and the recording information for storage as the image file, wherein the image processing means carries out the image processing of the image file stored in the storage medium for enhancing the picture quality of the digital image data based on the stored optimal image processing condition added to the image file.

6. The image reproducing method as defined in claim 1, further comprising:

adding a content of AE processing the recording information.

7. The image reproducing method as defined in claim 1, further comprising:

adding a designation indicating a direction to halt additional correction to the recording information.

8. The image reproducing method as defined in claim 1, further comprising:

adding a trimming designation function indicator to the recording information for designating an area of the digital image data to be trimmed.

9. The image reproducing method as defined in claim 1, further comprising:

adding at least one of a focusing length and a focusing position to the recording information.

10. The image reproducing method as defined in claim 1, further comprising:

adding at least one of a lighting condition obtained from a color sensor or exposure meter, a flash occurrence condition, and an outdoor weather indicator to the recording information.

11. The image reproducing method as defined in claim 1, further comprising:

adding a title of the digital image data to the recording information.

12. The image reproducing apparatus as defined in claim 3, further comprising:

means for adding a content of AE processing the recording information.

13. The image reproducing apparatus as defined in claim 3, further comprising:

means for adding a designation indicating a direction to halt additional correction to the recording information.

14. The image reproducing apparatus as defined in claim 3, further comprising:

means for adding a trimmings designation function indicator to the recording information for designating an area of the digital image data to be trimmed.

15. The image reproducing apparatus as defined in claim 3, further comprising:

means for adding at least one of a focusing length and a focusing position to the recording information.

16. The image reproducing apparatus as defined in claim 3, further comprising:

means for adding at least one of a lighting condition obtained from a color sensor or exposure meter, a flash occurrence condition, and an outdoor weather indicator to the recording information.

17. The image reproducing apparatus as defined in claim 3, further comprising:

means for adding a title of the digital image data to the recording information.

18. An image reproducing apparatus system comprising:

an image pick up unit that records digital image data;

a processing unit that provides automatic exposure processing to the digital image data; [and]

a recording information adding unit that adds recording information including a ratio of an input light amount versus an output voltage of the digital camera to the digital image data and stores the digital image data and the recording information together as an image file in an image server;

*image serving means for storing digital image data and the recording information together as an image file in an image server;*

*image processing means for carrying out an image processing of the image file for enhancing a picture quality of the digital image data using the stored recording information to determine an optimal image processing condition; and*

*reproducing means for reproducing the digital image data processed by the image processing means based on the optimal image processing condition.*

[19. The image reproducing apparatus system of claim 18 further comprising:

image serving means for storing digital image data and the recording information together as an image file in an image server;

image processing means for carrying out an image processing of the image file for enhancing a picture quality of the digital image data using the stored recording information to determine an optimal image processing condition; and reproducing means for reproducing the digital image data processed by the image processing means based on the optimal image processing condition.]

*20. A method for processing image data, comprising:*

*receiving digital image data recorded by a digital image recording device wherein recording information, which is used to enhance picture quality, is added to the digital image data; storing the digital image data and the recording information together as an image file; processing the digital image data of the stored image file using the recording information to enhance picture quality; determining at least one optimal image processing condition to be included in the recording information; processing the digital image data of the image file using the at least one optimal image processing condition; and reproducing the digital image using the processed digital image data.*

*21. The method of claim 20, wherein the recording information includes at least one of a content of AE processing, a designation for no correction wherein no correction to the digital image data will be made using the recording information during processing, mode setting information wherein additional processing will occur based on the mode setting information, a trimming designation for designating an area of the digital image data to be trimmed, a focusing length, a focusing position, a lighting condition, a flash occurrence condition, descriptive text information, and an outdoor weather indicator.*

*22. The method of claim 21, wherein the lighting condition may be obtained from at least one of a color sensor and exposure meter.*

*23. The method of claim 21, wherein mode setting information may include at least one of a portrait designation, a sun set designation, a snow designation, a scenery designation, and a monochrome designation.*

*24. The method of claim 20, wherein the image is reproduced using at least one of a monitor and a printer.*

*25. The method of claim 20, wherein processing employs a look-up table.*

*26. A method for recording image data, comprising:*

*receiving digital image data recorded by a digital image recording device wherein recording information, which is used to enhance picture quality, is added to the digital image data; storing the digital image data and the recording information together as an image file to*

*facilitate reproduction of the image from the stored digital image data including the recording information to enable processing with the recording information to enhance picture quality;*

*determining at least one optimal image processing condition to be included in the recording information;*

*processing the digital image data of the image file using the at least one optimal image processing condition; and*

*reproducing the digital image using the processed digital image data.*

*27. The method of claim 26, wherein the recording information includes at least one of a content of AE processing, a designation for no correction wherein no correction to the digital image data will be made using the recording information during processing, mode setting information wherein additional processing will occur based on the mode setting information, a trimming designation for designating an area of the digital image data to be trimmed, a focusing length, a focusing position, a lighting condition, a flash occurrence condition, descriptive text information, and an outdoor weather indicator.*

*28. The method of claim 27, wherein the lighting condition may be obtained from at least one of a color sensor and exposure meter.*

*29. The method of claim 27, wherein mode setting information may include at least one of a portrait designation, a sun set designation, a snow designation, a scenery designation, and a monochrome designation.*

*30. The method of claim 26, wherein the image is reproduced using at least one of a monitor and a printer.*

*31. The method of claim 26, wherein reproduction of the image includes processing the digital image data and the recording information while employing a look-up table.*

*32. A method for processing image data, comprising:*

*receiving digital image data representing an image recorded by a digital image recording device;*

*adding recording information, which is used to enhance picture quality, to the digital image data to form an image file;*

*processing the digital image data using the recording information;*

*determining at least one optimal image processing condition to be included in the recording information;*

*processing the digital image data of the image file using the at least one optimal image processing condition; and*

*reproducing the digital image using the processed digital image data using the at least one optimal image processing condition.*

*33. The method of claim 32, wherein the recording information includes at least one of a content of AE processing, a designation for no correction wherein no correction to the digital image data will be made using the recording information during processing, mode setting information wherein additional processing will occur based on the mode setting information, a trimming designation for designating an area of the digital image data to be trimmed, a color condition, a focusing length, a focusing position, a lighting condition, a flash occurrence condition, descriptive text information, and an outdoor weather indicator.*

*34. The method of claim 33, wherein the lighting condition may be obtained from at least one of a color sensor and exposure meter.*

*35. The method of claim 33, wherein mode setting information may include at least one of a portrait designation, a sun set designation, a snow designation, a scenery designation, and a monochrome designation.*

*36. The method of claim 32, wherein the image is reproduced using at least one of a monitor and a printer.*

*37. The method of claim 32, wherein processing employs a look-up table.*

*38. The method of claim 32, wherein the processing obtains the digital image data and recording information from the image file.*

*39. A method for reproducing images, comprising:*

*receiving digital image data representing an image recorded by a digital image recording device wherein recording information, which is used to enhance picture quality, is added to the digital image data;*

*storing the digital image data and the recording information together as an image file in memory; processing the digital image data utilizing the recording information to enhance picture quality; reproducing the processed digital image data;*

*determining at least one optimal image processing condition to be included in the recording information; processing the digital image data of the image file using the at least one optimal image processing condition; and reproducing the digital image using the processed digital image data using the at least one optimal image processing condition.*

*40. The method of claim 39, wherein the recording information includes at least one of a content of AE processing, a designation for no correction wherein no correction to the digital image data will be made using the recording information during processing, mode setting information wherein additional processing will occur based on the mode setting information, a trimming designation for designating an area of the digital image data to be trimmed, a color condition, a focusing length, a focusing position, a lighting condition, a flash occurrence condition, descriptive text information, and an outdoor weather indicator.*

*41. The method of claim 40, wherein the lighting condition may be obtained from at least one of a color sensor and exposure meter.*

*42. The method of claim 40, wherein mode setting information may include at least one of a portrait designation, a sun set designation, a snow designation, a scenery designation, and a monochrome designation.*

*43. The method of claim 39, wherein the image is reproduced using at least one of a monitor and a printer.*

*44. The method of claim 39, wherein the memory is at least one of random access memory, a secondary storage device and an image server.*

*45. The method of claim 39, wherein processing employs a look-up table.*

*46. An apparatus for processing image data, comprising:*

*a receiver receiving digital image data recorded by a digital image recording device and further providing recording information related to the digital image data and usable to enhance picture quality;*

*a storage module storing the digital image data and the recording information together as an image file;*

*a processor, operatively connected to the storage module, for processing the digital image data of the stored image file using the recording information to enhance picture quality;*

*a determining module determining at least one optimal image processing condition to be included in the recording information;*

*said processor processing the digital image data of the stored image file using the at least one optimal image processing condition; and*

*a reproducer reproducing the digital image using the processed digital image data.*

*47. The apparatus of claim 46, wherein the recording information includes at least one of a content of AE processing, a designation for no correction wherein no correction to the digital image data will be made using the recording information during processing, mode setting information wherein additional processing will occur based on the mode setting information, a trimming designation for designating an area of the digital image data to be trimmed, a focusing length, a focusing position, a lighting condition, a flash occurrence condition, descriptive text information, and an outdoor weather indicator.*

*48. The apparatus of claim 47, wherein the lighting condition may be obtained from at least one of a color sensor and exposure meter.*

*49. The apparatus of claim 47, wherein mode setting information may include at least one of a portrait designation, a sun set designation, a snow designation, a scenery designation, and a monochrome designation.*

*50. The apparatus of claim 46, wherein the reproducer uses at least one of a monitor and a printer.*

*51. The apparatus of claim 46, wherein the processor employs a look-up table.*

*52. An apparatus for recording image data, comprising:*

*a receiver receiving digital image data recorded by a digital image recording device relating recording information to the digital image data and usable to enhance picture quality;*

*a storage module storing the digital image data and the recording information together as an image file to facilitate reproduction of the image from the stored digital image data using the recording information to enhance picture quality;*

*a determining module for determining at least one optimal image processing condition to be included in the recording information;*

*a processor processing the digital image data of the stored image file using the at least one optimal image processing condition; and*

*a reproducer reproducing the digital image using the processed digital image data.*

*53. The apparatus of claim 52, wherein the recording information includes at least one of a content of AE processing, a designation for no correction wherein no correction to the digital image data will be made using the recording information during processing, mode setting information wherein additional processing will occur based on the mode setting information, a trimming designation for designating an area of the digital image data to be trimmed, a focusing length, a focusing position, a lighting condition, a flash occurrence condition, descriptive text information, and an outdoor weather indicator.*

*54. The apparatus of claim 53, wherein the lighting condition may be obtained from at least one of a color sensor and exposure meter.*

*55. The apparatus of claim 53, wherein mode setting information may include at least one of a portrait designation, a sun set designation, a snow designation, a scenery designation, and a monochrome designation.*

*56. The apparatus of claim 52, wherein the reproducer uses at least one of a monitor and a printer.*

*57. The apparatus of claim 52, further comprising a reproducer reproducing the image including processing the digital image data and the recording information, the reproducer including a look-up table.*

*58. An apparatus for processing image data, comprising:*

*a receiver receiving digital image data representing an image recorded by a digital image recording device;*

*an adder adding to the digital image data, recording information, which is used to enhance picture quality, to form an image file;*

*a processor processing the digital image data using the recording information;*

*a determining module for determining at least one optimal image processing condition to be included in the recording information;*

*said processor processing the digital image data using the at least one optimal image processing condition; and*

*a reproducer reproducing the digital image using the processed digital image data using the at least one optimal image processing condition.*

*59. The apparatus of claim 58, wherein the recording information includes at least one of a content of AE processing, a designation for no correction wherein no correction to the digital image data will be made using the recording information during processing, mode setting information wherein additional processing will occur based on the mode setting information, a trimming designation for designating an area of the digital image data to be trimmed, a color condition, a focusing length, a focusing position, a lighting condition, a flash occurrence condition, descriptive text information, and an outdoor weather indicator.*

*60. The apparatus of claim 59, wherein the lighting condition may be obtained from at least one of a color sensor and exposure meter.*

*61. The apparatus of claim 59, wherein mode setting information may include at least one of a portrait designation, a sun set designation, a snow designation, a scenery designation, and a monochrome designation.*

*62. The apparatus of claim 58, wherein the reproducer uses at least one of a monitor and a printer.*

*63. The apparatus of claim 58, wherein the processor employs a look-up table.*

*64. The apparatus of claim 58, wherein the processor obtains the digital image data and recording information from the image file.*

*65. An apparatus for reproducing images, comprising:*

*a receiver receiving digital image data representing an image recorded by a digital image recording device relating recording information to the digital image data and used to enhance picture quality;*

*a storage module storing the digital image data and the recording information together as an image file in memory;*

*a processor operatively connected to the storage module processing the digital image data utilizing the recording information to enhance picture quality;*

*a reproducer reproducing the processed digital image data;*

*a determining module determining at least one optimal image processing condition to be included in the recording information;*

*said processor processing the digital image data using the at least one optimal image processing condition; and*

*a reproducer reproducing the digital image using the processed digital image data using the at least one optimal image processing condition.*

*66. The apparatus of claim 65, wherein the recording information includes at least one of a content of AE processing, a designation for no correction wherein no cor-*

*rection to the digital image data will be made using the recording information during processing, mode setting information wherein additional processing will occur based on the mode setting information, a trimming designation for designating an area of the digital image data to be trimmed, a color condition, a focusing length, a focusing position, a lighting condition, a flash occurrence condition, descriptive text information, and an outdoor weather indicator.*

*67. The apparatus of claim 66, wherein the lighting condition may be obtained from at least one of a color sensor and exposure meter.*

*68. The apparatus of claim 66, wherein mode setting information may include at least one of a portrait designation, a sun set designation, a snow designation, a scenery designation, and a monochrome designation.*

*69. The apparatus of claim 65, wherein the reproducer uses at least one of a monitor and a printer.*

*70. The apparatus of claim 65, wherein the memory is at least one of random access memory, a secondary storage device and an image server.*

*71. The apparatus of claim 65, wherein the processor employs a look-up table.*

* * * * *